Patented Feb. 17, 1953

2,628,889

UNITED STATES PATENT OFFICE 2,628,889

PREPARATION OF HYDROXYLAMINE

Richard Edward Benson, Wilmington, Del., assignor to E. I. du Pont de Nemours & Company, Wilmington, Del., a corporation of Delaware No Drawing. Application August 27, 1949, Serial No. 112,841

5 Claims. (Cl. 23—190)

The present invention relates to a novel process for the preparation of hydroxylamine, and, more particularly, to a process for the catalytic production of hydroxylamine from nitric oxide and hydrogen.

Hydroxylamine has long been regarded as an important chemical intermediate in a wide variety of organic and inorganic syntheses. Despite its versatility in the preparation of a varied group of useful compounds, hydroxylamine has not been appreciably exploited in the field of industrial chemistry due to its high cost. This high cost is traceable to the lack of a cheap, commercially feasible synthesis thereof, and even now, despite the vast advances made in chemical technology, the costs are so high as to prohibit its use in all but a few applications.

Several methods have been uncovered in the past for the preparation of hydroxylamine, for instance, through the electrolysis of nitrates, through the acid hydrolysis of nitroparaffins, and through the hydrolysis of the sulfonate prepared by the reaction between sodium bisulfite, sodium nitrite and sulfur dioxide under slightly alkaline conditions. However, for various reasons, such as low yields, poor conversions, costly raw materials, and high operating and equipment costs, these methods cannot be used to produce low-cost hydroxylamine in appreciable concentrations.

Several investigators, notably Butterworth and Partington, Trans. Faraday Soc., 26, 144 (1930), Jouve, Compt. rend. 128, 435 (1899), and Cooke, Proc. Phil. Soc., Glasgow, 18, 291 (1887), have demonstrated the fact that hydroxylamine can be prepared directly by the catalytic hydrogenation of nitric oxide. However, despite the fact that the raw materials required are cheap, the various methods reported by these investigators do not represent successful commercial syntheses since only very low conversions and yields (about 2-3%) are obtained. Thus, it would be necessary to concentrate the reaction mixtures produced quite thoroughly, e. g., a reduction in volume of the order of 15 to 25 fold, before the product could be obtained in useful concentrations. Such a procedure has not proven possible due to the considerable decomposition rate of the free hydroxylamine. Furthermore, even if methods were worked out to successfully accomplish such a concentration, the high operational costs due to the volume of solutions and solvents necessarily handled and the equipment restrictions necessarily involved in avoiding appreciable decomposition of the product would make it impossible to produce low-cost hydroxylamine.

It is an object of the present invention to provide a more economical and commercially practical method of preparing hydroxylamine. A further object of the present invention is to provide a method of preparing hydroxylamine which requires only simple equipment yet produces a good yield. A still further object of the present invention is to provide a method of preparing hydroxylamine from low cost, readily available materials. Further objects will become apparent as the invention is further described.

I have found that the above objects are attained when I hydrogenate nitric oxide in the presence of a platinum catalyst and a strong mineral acid. The hydrogenation may be performed at temperatures ranging from the freezing point of the reaction mixture to 40° C., and the volume ratio of the nitric oxide to hydrogen should be less than one. The pH of the reaction mixture should be maintained below 2.50. For the highest yields and conversions it is preferred to carry out the hydrogenation reaction at temperatures in the range 0° to +10° C. at a pH of less than 2.25 and with nitric oxide:hydrogen volume ratios ranging from 1:1.5 to 1:6. The improved process of this invention, using, as it does, very cheap, readily available raw materials and requiring no complicated reaction vessels and, in fact, no purification stages whatsoever, thus makes it possible to produce hydroxylamine at an attractive cost.

The following examples in which the parts given are by weight unless otherwise indicated are submitted to further illustrate and not to limit this invention:

*Example I*

Into a glass reactor, containing 376 parts of a 10% hydrochloric acid solution and one part of 10% platinum-on-charcoal catalyst and fitted with a reflux water condenser, a stirrer, and a gas inlet tube connected through a suitable mixing vessel to sources of hydrogen and nitric oxide, so arranged that the input of both gases can be separately measured, was passed a mixture of 35 and 250 parts by volume per minute of, respectively, nitric oxide and hydrogen over a period of one hour at a positive pressure of 51 mm. of mercury. At the end of this time the reaction vessel was cooled to 1° C. and 36.5/210 parts by volume per minute of nitric oxide/hydrogen gas mixture passed through for an additional hour at the same pressure. The reaction was continued in the same fashion for an additional three hours with the temperature of the reactor varying from −2 to +1° C. and the input gas mixture varying from 33.5 to 36.0 and from 194 to 210 parts by volume per minute of nitric oxide and hydrogen, respectively.

The average nitric oxide utilization was 61.7% and there was a total of 10,580 parts by volume of nitric oxide admitted into the reaction zone.

At the end of the five-hour reaction period and after removal of the catalyst by filtration there was obtained 357 parts of a hydrochloric acid solution of hydroxylamine containing 6.02 parts of hydroxylamine, which, based on the nitric oxide consumed, and the average nitric oxide conversion of 61.7%, represents 69.5% of the theoretical yield of hydroxylamine.

*Example II*

Another reaction is carried out utilizing the same equipment and method of isolation described in Example I. In this instance 320 parts of an 8.5 per cent hydrochloric acid solution and 1.0 part of 10 per cent platinum-on-charcoal catalyst are first heated in the reaction vessel to 50° C. for 10 minutes with hydrogen passing through the reaction mixture at a rate of 200–250 parts by volume per minute. The reaction mixture is then cooled to 5° C., the input hydrogen rate is adjusted to 48–50 parts by volume per minute, and nitric oxide is introduced into the reaction zone at a rate of 32–34 parts by volume per minute. The reaction is continued in this fashion for an additional 350 minutes while maintaining the temperature of the reaction mixture between 2° and 3° C. There is finally obtained an 11 per cent yield of hydroxylamine at an average nitric oxide conversion of 29 per cent.

*Example III*

Another reaction was carried out utilizing the same equipment and operating conditions described in Example I, varying only in using 356 parts of a 10% aqueous phosphoric acid solution at a temperature range of 26–28° C. initially and 0–3° C. for the majority of the reaction period. In this instance the nitric oxide/hydrogen ratio in parts by volume per minute varied from 46:260 to 50:295. There was obtained a 42% yield of hydroxylamine at 55% conversion of nitric oxide (figures uncorrected for purity of nitric acid).

The identity of the hydroxylamine was definitely established by reacting the neutralized reaction mixture with cyclohexanone to form cyclohexanone oxime which had a melting point of 89.5° C. after recrystallization from n-hexane.

*Example IV*

Another reaction was carried out utilizing the same equipment and operating conditions described in Example I, varying only in that 320 parts of a 10% aqueous sulfuric acid solution was used at a temperature range of 26–28° C. initially and −1 to 0° C. for the majority of the reaction period. In this instance, the nitric oxide/hydrogen ratio in parts by volume per minute varied from 32:295 to 35:350. There was obtained a 45% yield of hydroxylamine at 37% conversion of nitric oxide (figures uncorrected for purity of nitric oxide).

*Example V*

A stainless steel high pressure reactor of internal capacity corresponding to 400 parts of water and fitted with inlet and exit tubes and means for appropriately sealing the tube was charged with 107 parts of 10% sulfuric acid and one part of 10% platinum-on-charcoal catalyst and the reactor closed and evacuated. Nitric oxide was pressured in until an internal gauge pressure of 50 lb./sq. in. was reached. Then hydrogen was pressured into the reactor until a total internal gauge pressure of 1,000 lb./sq. in. was reached. The reactor was then closed and allowed to rock at room temperature for three hours. At the end of this time the reactor was vented to atmospheric pressure, opened and the contents removed. After filtration of the reaction mixture to remove the catalyst, there was obtained a sulfuric acid solution of hydroxylamine which upon analysis was found to contain 0.97 part (71% yield) of hydroxylamine.

*Example VI*

In a manner similar to that described previously in Example I and using the equipment described therein, 1.0 part of 10 per cent platinum-on-charcoal catalyst suspended in a mixture of 42.6 parts of 70 per cent nitric acid and 270 parts of water was treated with a mixture of nitric oxide and hydrogen at 27–30° C. for 20 minutes and subsequently after cooling at 0–5° C. for a total reaction time of 6 hours. The nitric oxide and hydrogen inputs varied, respectively, from 25.0 to 27.5 and from 170 to 175 parts by volume per minute. Analytical results indicated 89 per cent of the input nitric oxide to be reacted. The presence of hydroxylamine was verified by analytical procedures.

The importance of pH in this reaction has already been mentioned. At values of pH appreciably greater than 2.50, only relatively small quantities of hydroxylamine can be prepared by this reaction procedure. Best results in this synthesis are obtained by operating at a pH below 2.50, e. g., in the range from 0.1 to 2.25.

The important effect of pH in this synthesis is well illustrated by the following run which was conducted in a manner similar to that described in Example I except that provision was made for removal of samples from the reaction mixture without interrupting the reaction. The hydrochloric acid solution used exhibited a pH of 0.8 initially. During the reaction, the pH of the mixture increased to 1.30 and then to 2.25 at hydroxylamine yields of 46.0–46.5%. However, when a pH of 5.55 was reached in the reaction mixture, the concentration of hydroxylamine present had actually decreased with respect to that present at the previous lower pH values. Analysis indicated an apparent overall yield of only 32%, thus corresponding to an actual decrease of about 14% absolute (i. e., relatively about 30%) in the total yield of hydroxylamine. Finally by the time the pH had reached 9.20, hydroxylamine was no longer detectable in appreciable quantities in the reaction mixture.

Similarly, another reaction carried out at pH values ranging from 0.90, initially, to 1.50 produced hydroxylamine in 65% yield. Continuation of the reaction until a pH of 6.0 was reached led to a reaction mixture containing approximately 50% less hydroxylamine than was present in the same reaction mixture previously when the pH was 1.50, i. e., an overall yield of hydroxylamine of approximately 33%.

These results thus clearly indicate that as the pH of the reaction medium increases above a certain optimum value (approximately 2.25–2.50), the rate of production of hydroxylamine appreciably decreases and that as the pH approaches values somewhere in the range of 6.0–6.5, hydroxylamine is being destroyed faster than it can be made, and finally, when the pH of the reaction medium has increased to a pH of 9 or thereabouts, that all but a minor amount of the hydroxylamine present, even including that remaining from the relatively high yields prepared in the low pH ranges, has been destroyed.

From the foregoing, it is apparent that in a batch process, for optimum yields, the proportions of the ingredients will be regulated so that the pH of the reaction mixture will be less than 2.5 when the reaction is completed. Similarly, in a continuous process, wherein the gaseous mixture of nitric oxide and hydrogen is passed through a solution of a strong mineral acid containing the catalyst, a sufficient amount of the reaction mixture will be withdrawn and replaced with a fresh acid solution so that the pH of the reaction mixture will not exceed 2.5. This withdrawal and replacement can be either intermittent or continuous inasmuch as the yield is not affected until the pH exceeds 2.5, and an excess quantity of acid is not harmful at this pH level, i. e., acidic, the product is in the form of an acid salt of hydroxylamine.

The acids which have been used most successfully are the common, strong, inorganic, i. e., mineral acids, e. g., hydrochloric, nitric, sulfuric and phosphoric acids. However, weaker acids, such as dilute acetic acid can be used when care is taken to continue adding further quantities of such acids as the reaction proceeds in order to maintain as acidic conditions as is possible with these weaker acids. It is important that a careful control be maintained of the relative proportions of nitric oxide and hydrogen being used in the reaction mixture. For best results it is necessary that nitric oxide to hydrogen ratios less than one and preferably from 1:1.5 to 1:6 be used, although ratios as low as 1:10 are still operable. In this preferred range of 1:1.5 to 1:6 maximum yields and conversions are obtained in the preferred pH and temperature ranges irrespective of other operating conditions, provided that the reactants are adequately mixed, preferably using vigorous agitation.

As previously pointed out, this reaction can be carried out successfully, either batchwise or continuously, at temperatures ranging from the freezing point of the reaction mixture to 40° C. The freezing point of the reaction mixture will, of course, vary with the nature and amount of the acid being used as well as the amount of hydroxylamine present. For maximum conversions and yields, temperatures in the range −5 to +30° C., and from a cost viewpoint temperatures from 0 to 10° C., are preferred. Reaction conditions similar to those given in Example I are those preferred in continuous operations, although operation under superatmospheric pressure may also be carried out in a continuous fashion.

A run similar to that set forth in Example I, varying in that the initial temperature of 30° C. was maintained for 25 minutes and the subsequent reaction temperature of 0° to 5° C. was continued for a total reaction time of 5 hours, was carried out at a positive pressure of 65 mm. of mercury with the nitric oxide and hydrogen input rates to the reaction zone varying respectively from 182–226 and from 125–142 parts by volume per minute, i. e., at an average nitric oxide: hydrogen volume ratio of approximately 1.52:1.0. Analytical results obtained from the off gases indicated that variously from 1 to 38 per cent of the nitric oxide admitted to the reaction zone was not recovered. However, attempts to demonstrate the presence of hydroxylamine in the reaction zone, even with a test as sensitive as the salicylaldehydecupric acetate test (detailed on pages 187 to 188 of F. Feigl's "Qualitative Analysis by Spot Tests," third edition, 1946, Elsevier, New York) failed to demonstrate the presence of any hydroxylamine whatsoever. Thus the criticality of the range of nitric oxide:hydrogen volume ratios for the successful production of hydroxylamine is well established.

As has been demonstrated by the examples, the efficiency and success of this reaction are nowise dependent on operating pressures. The reaction is equally efficient, in the preferred ranges of temperature, pH and nitric oxide to hydrogen ratios, at atmospheric pressures as well as at 1,000 lb./sq.in. pressures or higher. From the standpoint of simplicity or equipment, it is preferable to operate in the range of from 1 to 50 lb./sq.in. In this connection, it should be recognized that in those reactions involving the handling of nitric oxide/hydrogen gas mixtures under pressures appreciably above atmospheric, for example, over 50 lb./sq.in. especially in the relative proportions previously mentioned as preferred in the process of this invention, extreme care should be taken since these mixtures are potentially explosive.

Although only platinum-on-charcoal catalysts are mentioned in the examples, platinum catalysts of various types known in the art can be used, for instance, metallic platinum itself, platinized platinum, platinized platinum-on-kieselguhr, or platinum on any one of the known acid-resistant catalyst carriers, platinized or not.

Hydroxylamine prepared by the process of this invention can be used in the many reactions described in the literature for this compound.

While the invention has been described in detail in the foregoing it must be recognized that the examples are illustrative only and that many variations may be made without departure from the scope of the present invention. Therefore, I intend to be limited only by the following claims.

I claim:

1. A process for the catalytic hydrogenation of nitric oxide to produce an acid solution of hydroxylamine which comprises catalytically hydrogenating nitric oxide with elemental hydrogen in a medium consisting essentially of water, a platinum catalyst and a strong mineral acid, said medium having a pH of less than 2.5 and being maintained at a temperature between the freezing point of the reaction mixture and 40° C., the molar ratio of the nitric oxide to the elemental hydrogen present being less than 1.

2. A process as claimed in claim 1, wherein the temperature is maintained between 0° and 10°C.

3. A process as claimed in claim 1, wherein the molar ratio of nitric oxide to hydrogen is from 1:1.5 to 1:6.

4. A process as claimed in claim 1, wherein the pH is less than 2.25.

5. A process for the catalytic hydrogenation of nitric oxide to produce an acid solution of hydroxylamine which comprises first forming a gaseous mixture of nitric oxide and molecular hydrogen wherein the molar ratio of nitric oxide to hydrogen is less than 1, and thereafter catalytically hydrogenating said nitric oxide by passing said gaseous mixture into an aqueous solution consisting essentially of water, a platinum catalyst, and a strong mineral acid, said solution having a pH of less than 2.5 and being maintained at a temperature between the freezing point of the reaction mixture and 40° C.

RICHARD EDWARD BENSON.

REFERENCES CITED

The following references are of record in the file of this patent:

J. W. Mellor's "A Comprehensive Treatise on Inorganic and Theoretical Chemistry," Vol. 1 (1922 ed.), page 330, and vol. 8 (1928 ed.), pages 279, 280, 285–287. Longmans, Green & Co., New York.

J. W. Mellor's "Modern Inorganic Chemistry," pages 638, 639, 665; single volume, new impression of eighth ed.; January 1935. Longmans, Green & Co., New York.

Butterworth and Partington, Trans, Faraday Soc., vol. 26, pages 144–147 (1930).

Cooke, Proc. Phil. Soc., Glasgow, vol. 18, pages 291–293 (1886-1887).

McPherson and Henderson's "A Course in General Chemistry," third ed., pages 681–683. Ginn & Co., New York.